United States Patent
Chen (10) Patent No.: US 11,189,193 B2
(45) Date of Patent: Nov. 30, 2021

(54) AFFINITY KNOWLEDGE BASED COMPUTATIONAL LEARNING SYSTEM

(71) Applicant: Ponddy Education Inc., San Jose, CA (US)

(72) Inventor: Franz C. Chen, San Jose, CA (US)

(73) Assignee: PONDDY EDUCATION INC., San Jose, CA (US)

( * ) Notice: Subject to any disclaimer, the term of this patent is extended or adjusted under 35 U.S.C. 154(b) by 0 days.

(21) Appl. No.: 15/498,398

(22) Filed: Apr. 26, 2017

(65) Prior Publication Data

US 2017/0309202 A1 Oct. 26, 2017

Related U.S. Application Data

(60) Provisional application No. 62/327,598, filed on Apr. 26, 2016.

(51) Int. Cl.
*G09B 19/06* (2006.01)
*G09B 5/02* (2006.01)
*G09B 7/00* (2006.01)
*G09B 5/06* (2006.01)

(52) U.S. Cl.
CPC .............. *G09B 19/06* (2013.01); *G09B 5/02* (2013.01); *G09B 5/06* (2013.01); *G09B 7/00* (2013.01)

(58) Field of Classification Search
CPC ............. G09B 19/06; G09B 5/02; G09B 7/00
See application file for complete search history.

(56) References Cited

U.S. PATENT DOCUMENTS

| | | | |
|---|---|---|---|
| 5,904,485 A | 5/1999 | Siefert | |
| 6,810,376 B1 * | 10/2004 | Guan | G06F 17/2785 704/9 |
| 7,207,804 B2 * | 4/2007 | Hersh | G09B 5/065 434/219 |
| 8,182,270 B2 * | 5/2012 | Elzinga | G09B 7/00 434/322 |
| 8,280,720 B2 | 10/2012 | Tsuzuki et al. | |
| 8,375,073 B1 * | 2/2013 | Jain | G06Q 50/184 |
| 8,521,509 B2 | 8/2013 | Abir | |
| 8,880,392 B2 | 11/2014 | Abir | |
| 9,262,935 B2 | 2/2016 | Nielson et al. | |
| 2002/0087416 A1 | 7/2002 | Knutson | |
| 2004/0249626 A1 * | 12/2004 | Neal | G06F 17/2264 704/1 |
| 2007/0184423 A1 | 8/2007 | Stuppy | |
| 2007/0202481 A1 | 8/2007 | Smith Lewis et al. | |
| 2008/0241812 A1 | 10/2008 | Ashmore et al. | |
| 2009/0092952 A1 * | 4/2009 | Schlanger | G09B 19/04 434/169 |

(Continued)

FOREIGN PATENT DOCUMENTS

| | | |
|---|---|---|
| CN | 104809108 A | 7/2015 |
| WO | 01/69830 A2 | 9/2001 |
| WO | 2014/151983 A2 | 9/2014 |

*Primary Examiner* — Eddy Saint-Vil
(74) *Attorney, Agent, or Firm* — Klein, O'Neill & Singh, LLP (57) ABSTRACT

An affinity knowledge library generates a library of word pairs having both independent and dependent affinities with one another, and uses that affinity knowledge library to create customized curriculums based upon affinities of students and teachers.

27 Claims, 8 Drawing Sheets

(56) References Cited

U.S. PATENT DOCUMENTS

| | | | |
|---|---|---|---|
| 2009/0327053 A1* | 12/2009 | Niblock | G06Q 10/10 434/118 |
| 2011/0161073 A1* | 6/2011 | Lesher | G06F 17/2795 704/10 |
| 2011/0208508 A1* | 8/2011 | Griddle | G06F 17/2715 704/9 |
| 2011/0256521 A1* | 10/2011 | Mansfield | G09B 7/00 434/350 |
| 2012/0078918 A1* | 3/2012 | Somasundaran | G06F 17/278 707/748 |
| 2012/0158634 A1 | 6/2012 | Spring | |
| 2012/0179682 A1* | 7/2012 | De Saeger | G06F 17/2715 707/737 |
| 2012/0191445 A1* | 7/2012 | Markman | G06F 17/2785 704/2 |
| 2013/0021346 A1* | 1/2013 | Terman | G09B 5/08 345/467 |
| 2013/0132071 A1* | 5/2013 | Peterson | G06F 17/218 704/9 |
| 2014/0170629 A1 | 6/2014 | Keim et al. | |
| 2014/0249799 A1* | 9/2014 | Yih | G06F 17/277 704/9 |
| 2014/0295384 A1* | 10/2014 | Nielson | A61B 5/162 434/157 |
| 2015/0120593 A1 | 4/2015 | Madhavan et al. | |
| 2015/0227505 A1* | 8/2015 | Morimoto | G06F 17/2785 704/9 |
| 2016/0078772 A1* | 3/2016 | Bhat | G06F 16/338 434/322 |
| 2016/0180730 A1* | 6/2016 | Lee | G09B 7/02 434/157 |
| 2016/0188566 A1* | 6/2016 | Jifroodian-Haghighi | G09B 5/02 704/10 |
| 2016/0225278 A1 | 8/2016 | Leddy | |
| 2017/0255603 A1* | 9/2017 | Kajinaga | G06F 17/241 |

* cited by examiner

AFFINITY KNOWLEDGE BASED COMPUTATIONAL LEARNING SYSTEM

This application claims priority to U.S. Provisional Application No. 62/327,598, filed on Apr. 26, 2016. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is computational learning systems and methods.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Teachers for classes traditionally follow a curriculum designed to teach students in a class a particular set of skills, such as math, biology, and writing skills. Generic curriculums, however, may not always be optimal for every student. Some students may learn faster than other students, or may have a greater facility with certain learning methods than other learning methods. While teachers can cater curriculums to each individual student in a class, learning the habits of each student and creating a personalized curriculum can be very time-consuming and might not be the best use of the teacher's time.

U.S. Pat. No. 5,904,485 to Siefert teaches a computer-assisted education system that provides a learning profile for every student, which indicates the student's capabilities, preferred learning style, and progress. Siefert's system provides an intelligent administrator that selects appropriate material for presentation to the student during each learning session, and presents material in different ways when a first way of presenting material does not result in a score above a given threshold level. Siefert's system, however, only selects curriculums from currently provided curriculums and fails to automatically create new curriculums in response to a student's performance.

US 2014/0170629 to Keirn teaches an automated teaching system that provides a tree-based flowchart that allows the curriculum to adapt to a student's changing needs. Keirn's system, however, still requires the system to respond in a pre-programmed way, and does not allow the system to dynamically change how the curriculum is built by dynamically learning how the student responds to certain lessons.

U.S. Pat. No. 8,280,720 to Tsuzuki teaches an association dictionary apparatus that calculates the degree of association between a search word and other words in a user's profile to create associated word pairs. U.S. Pat. No. 8,521,509 to Abir teaches a similar system that associates words and word strings by analyzing word formations around a word or word string to identify other words or word strings that are semantic equivalents. Both Tsuzuki and Abir's systems, however, only analyze relative word distance from one another to determine what words might be associated with one another.

US 2007/0202481 to Smith Lewis teaches a system that obtains personalized study content by selecting study content based upon the user's study goals and study preferences that the user has input into the system. Study items selected based on the study goals and preferences can be used to query a database of potential learning content to specifically tailor the learning content to the student in question. Smith Lewis' system, however, does not focus on future goals of a student, nor on any long-term path that may be unforeseen by the student.

Thus, there remains a need for a system and method that improves how teaching curriculums are created.

SUMMARY OF THE INVENTION

The inventive subject matter provides apparatus, systems, and methods in which a system creates an affinity knowledge library of words having independent and dependent affinities with one another, and uses that affinity knowledge library to create customized curriculums based upon affinities of students and teachers.

This on-line curriculum generation system uses machine learning techniques to enable intelligent content personalization capabilities optimized for an efficient and effective learning experience. This patent describes the uniqueness of the techniques in the system. It has many major components. An affinity knowledge library that stores a collections of highly relevant and coherent contents based on contents provided by an affinity content curator that identifies, processes, and organizes both static and dynamic contents/information according to a targeted affinity interest. Affinity learning modules are units of learning elements created using one or more elements from the affinity knowledge library to support a coherent learning objective. A learning strategy planning module consists of a student learning planning sub-module and a strategic curriculum planning sub-module that uses data such as student's demographics, individual interests, learning objectives, teaching themes, past learning trails of a user or a user group, past decision trails of a user and a user group, and other factors to create a set of affinity selection matrices. An affinity content generator uses the affinity library together with or without affinity modules, and a set of affinity selection matrices to dynamically generate content. A content patrol module that filter the results for criteria such as age appropriateness, sex, violence, social value, etc. before the contents are presented to the user. Contents are presented in suggested manner where the users' decisions are feedback to the system.

The system continues update and personalize for a user and/or a user group using data based on the trails of user engagement with the system, new contents updated and expanded in the affinity library, and factors used in tuning of the student learning planning sub-module and the strategic curriculum planning sub-module.

The system creates an affinity knowledge library based upon databases of content. Contemplated databases include language databases having a plurality of words, mathematics databases having a plurality of formulas, and computer databases having a plurality of segments of computer code. Contemplated databases include general sources of fixed content, such as books and treatises (e.g. dictionaries, textbooks, code libraries, algorithm libraries), and user or class-specific sources of dynamic content such as news sites, blogs, and social media aggregators. The system analyzes the database and defines independent affinities for individual words and dependent affinities for word-pairs.

As used herein, an "independent affinity" comprises an affinity characteristic of an element that has a value that is independent from other words in the database, such as a word in a language database. Contemplated independent affinities include a level of difficulty, a theme of the word, a vector of words that frequently appear together with the word in a topic and/or context, a language of the word, a list of synonyms of the word, a list of antonyms of the word, a root for the word, a radical of the word, a phonemic sound of the word, and a prosody of the word. As used herein, a "dependent affinity" comprises an affinity characteristic of an element that has a value that depends upon the element's relationship with another element in a pair, such as a word's relationship with another word in a word-pair. Contemplated relationships include a shared difficulty, a shared theme, a shared context, a shared root, a shared radical, a shared phonetic sound, a shared phonemic sound, a shared prosody, a probability of sentence co-location, a probability of paragraph co-location, a probability of co-location within a selected number of words (e.g. within 5 words or within 10 words of one another), and a probability of theme or subtheme co-location (e.g. within text of a certain theme such as biology or subtheme such as toxicology).

The system has dependent affinity functions and independent affinity functions that are used to derive values for independent affinities and dependent affinities. For example, an independent affinity function to determine a level of difficulty for a word could be configured to look up the word in various language learning systems (e.g. HSK for simplified Chinese or TOCFL for traditional Chinese) to determine the level of difficulty for the word. A dependent affinity function to determine the probability of a two words being co-located together in a sentence could search a language database to determine the probability of finding a second word in a sentence given the existence of a first word in the sentence. The system preferably runs the functions on words and saves words in the affinity knowledge library having positive independent affinities, and runs the functions on word-pairs and saves word-pairs in the affinity knowledge library having positive dependent affinities. As used herein, a "positive affinity" is an affinity with a non-null or non-zero value. Some words may not have any positive dependent affinities, such as words that are not synonyms of one another, do not share any attributes with one another, and are never used in a sentence with one another. Depending upon the independent affinities defined by the system, some words may not have any positive independent affinities, such as a word that fails to have any roots. In some embodiments, the system may only save word-pairs having probability levels greater than a threshold level, such as 1% or 0.5%.

Independent affinities and dependent affinities may have any quantifiable form, such as a single value (e.g. a language of the word), a plurality of values (e.g. a list of synonyms of the word or a vector of words that frequently appear together in a geology topic), and a range of values (e.g. a range of difficulty levels for the word). In some embodiments, one or more independent or dependent affinities could be defined by a user via a user interface. For example, a teacher user could manually add or remove synonyms and/or antonyms from a word.

The system could derive word-pair affinities for any word-pairs saved in the affinity knowledge library as a function of the corresponding dependent affinities. For example, the word-pair affinity between the words "eat" and "banana" could have a higher word-pair affinity than the word-pair affinity between the words "eat" and "radish" because the words "eat" and "banana" appear in sentences together with a greater frequency. A word-pair may have many word-pair affinities depending upon the context within which the system examines the word-pair. For example, a word-pair affinity may have a greater affinity within a literature context than it would have within a scientific context. The system could assign weighted scores to some of the dependent affinities when determining a word-pair affinity. For example, the system could assign a higher weight towards word-pairs that are synonyms of one another than word-pairs that share the same prosody.

Preferably, each word in the affinity knowledge library with at least two word-pairs have the word-pairs ranked by their word-pair affinities. For example, the word "sports" may have the word-pairs "sports-baseball," "sports-football," and "sports-stadium" associated with it, where "sports-football" has the highest word-pair affinity and "sports-stadium" has the lowest word-pair affinity. Using a list rank-ordered by word-pair affinities, the system could prioritize associating words of a higher word-pair affinity than words of a lower word-pair affinity.

The affinity knowledge library stores a collection of highly relevant and coherent contents provided by an affinity-based content curator that identifies, processes, and organizes both static and dynamic contents/corpus/information according to a targeted affinity interest. The operation of the curator varies according to the targeted affinity interest. There are many groups of affinity interest that the system processes.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Two computer system that are "functionally coupled to" one another are coupled to one another using a networked wired or wireless connection.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

Figure 1:
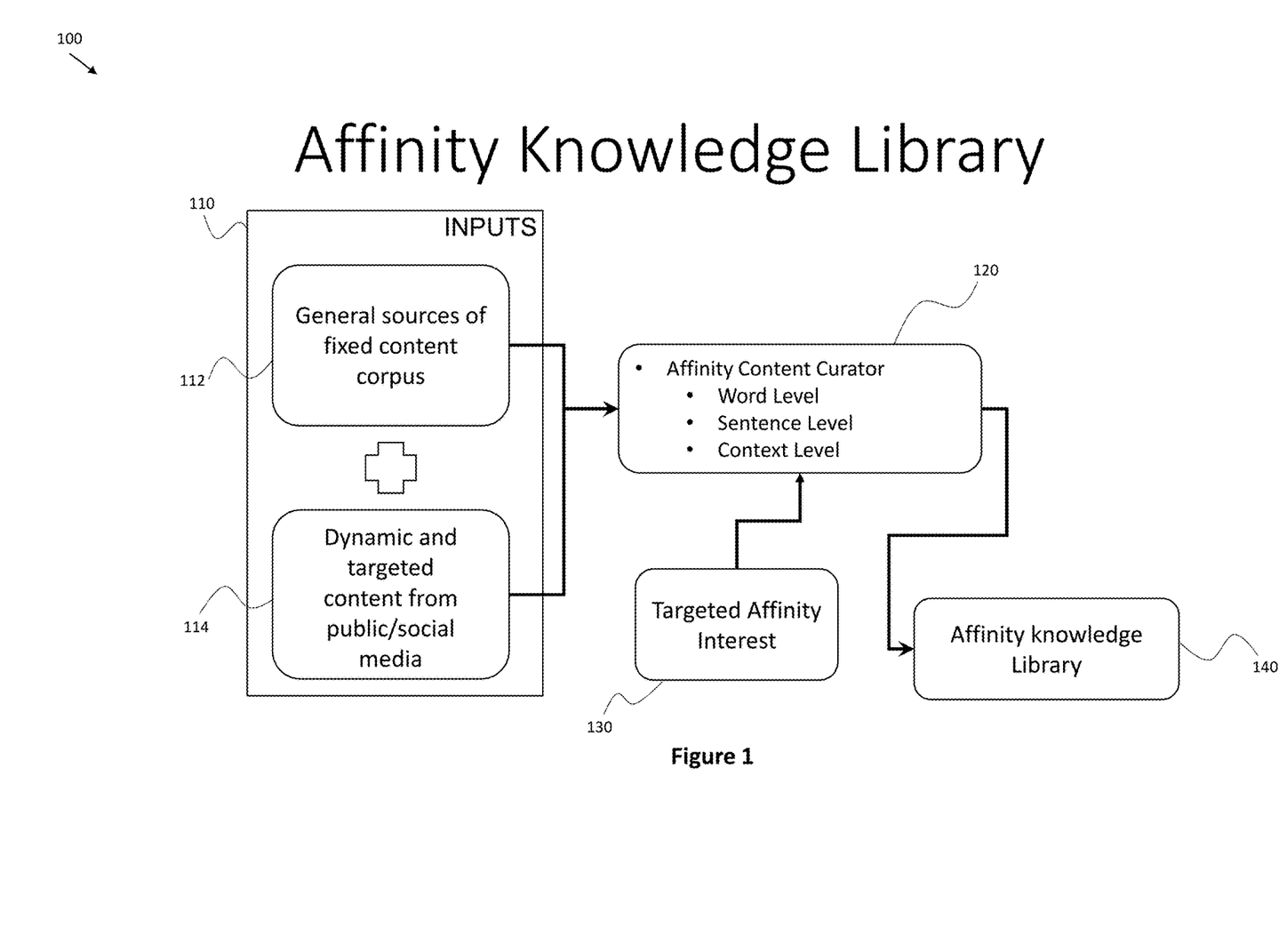
FIG. 1 is a schematic describing modules used to build an exemplary affinity knowledge library.

In FIG. 1, a schematic 100 shows inputs 110 that are fed into an affinity content curator 120 along with a targeted affinity interest 130 to generate an affinity knowledge library 140 that contains dependent affinities based upon word-pair relationships. Inputs 110 comprise both general sources of fixed content corpus 112 and dynamic and targeted content from non-fixed sources, such as published forums, blogs, news media, and social media. Both are generally stored on databases accessible by the system.

As used herein, "fixed content corpus" comprises immutable content that does not change over time. This includes published books, treatises, dictionaries, encyclopedias, and other content with a fixed publication date that do not update from version to version. Such data is immutable and is commonly treated differently than "non-fixed content," which is pulled from mutable sources, such as newspapers, blogs, forums, and social media sites and the like. Both fixed and non-fixed content sources are typically weighted by the system on various scales, such as "trustworthiness" and "currentness." A "trustworthiness" scale is typically administered to by an administrator user that generally manually judges how trustworthy a non-fixed source is. For example a peer-reviewed source that is only published after a threshold number (e.g. 10 peers) approve the content can be given a higher weight than a non-peer reviewed non-fixed source. A "currrentess" scale is typically calculated using a formula that gives a higher weight to sources that have been published more recently, with a logarithmic curve that tapers from a currentness rating of 1 for a source that has just been published to a currentness rating of 0 for a source that was published years ago.

Such inputs are fed into the affinity content curator 120, which analyzes the input sources 110 along with the targeted affinity interest 130 to generate affinity knowledge library 140. The input sources could be chosen manually or automatically based upon a function or a template. For example, a teacher who wishes to generate an affinity knowledge library for a Beginner Chinese class may input lesson plans and tests that are planned for a year's curriculum into the system as inputs, as well as books assigned to the class, and various age-appropriate social media websites, whereas a teacher who wishes to generate an affinity knowledge library for an Advanced Chinese class may input all known Chinese text that is accessible by the system. Automated flowcharts could be constructed that automatically pull relevant sources based upon a decision tree. For example, every year an automated flow could collect lesson plans that have been submitted by a plurality of teachers in a school district as well as a plurality of books assigned by all teachers to classes in that school district. The lesson plans and the books assigned to the various classes could change year by year, which would alter the content of inputs 110, as well as the content of affinity knowledge library 140.

Targeted affinity interest 130 comprises a library of targeted affinity interest keywords, sentences, or content that defines relationships between words to achieve a learning objective. This is important because, with semantic content-based approaches that find similar sentences, a semantic for sentence such as: "The monkey likes to eat apples" may be considered semantically different for "The monkey likes to eat bananas". Because the word "banana" can be considered both an adjective (e.g. synonym for crazy) and a noun (e.g. a type of fruit). When evaluating a sentence using the targeted affinity interest for the word "eat", the system determines the affinity distance between the words "eat" and "apple" (as a noun) vs. "eat" and "banana" (as a noun) in a vast number of corpus/information and measure their probability of collocation. By targeting affinity interests only around a library of targeted affinity interest keywords, the system is programmed to derive more relevant affinities.

Below are lists of different types of targeted affinity interests that could be used to define both independent affinities and dependent affinities for words and word-pairs.

Word Level—Targeted Affinity Interest Based on Lexicon or Semantics

Synonyms. Words of similar meaning. Example: good vs. benefit

Antonyms. Words of opposite meaning. Example: good vs. bad, evil, malicious, etc.

Word Level—Targeted Affinity Interest Based on Composition

Word roots (pre-fix, post-fix, Latin root, Greek root). Example, In English, a pre-fix "carn-" has Latin origin that means flesh, appear in words like carnage, carnal, carnality, carnary, carnate, carnation, etc.

Radicals. Example, In Chinese, a set of Chinese characters can share a similar radical/component. Characters like 吃 "eat", 喝 "drink", and 唱 "sing" all share a radical 口 "kou", meaning "mouth".

Word Level—Targeted Affinity Interest Based on Phonetic Features

Phonemic. A distinctive or contrastive set of sound occurred in a language. For example, In English sounds p, ph, non-released p, are treated as a single phonological unit, or phoneme, their redundant phonetic differences ignored.

Prosody (stress, tempo, rhythm, pause, emotion, discourse, grammar). For example, in Chinese language, a stress variant of a sound would have different meanings. Particularly, in Mandarin Chinese, there are 5 tones for a sound (4 stress variants and a natural tone) and the total variant of sounds in the language is less than 2000. It very easy for user to confuse the sounds and/or miss-pronounce the word. The matter become worst when tempo, emotion and other prosodic elements are involved. Affinity interest based on Prosody of various target interest can help.

Sentence Level—Targeted Affinity Interest

Collocation of words in a sentence. This is the conditional probability or co-occurrence of words in a sentence. For example, the word "like" has high probability of collocation with word "I" and "eat" in sentences of many languages.

Context Level—Targeted Affinity Interest

Theme

These are categories of contents centered around topics that are related to life experiences. For example, In language learning, 6 major themes such as Global Challenges, Science and Technology, Contemporary Life, Personal and Public Identities, Family and Communities, and Beauty and Aesthetics are used. Each of these themes can be further expanded into sub-themes to better organize the content.

Word Vector

A set of keywords that frequently appear together in a given topic or context. For example, in biology, antigen, white cell, T-cell, killer cell, etc. are associated in the context of immunology.

Level of Difficulties

Content that tend to appear according to the stage of a learning ranging from beginner to advance. The range are typically segmented using qualitative and/or quantitative method to create levels that best describes the learner capability of dominance of the subject or learning material. For Example, "HSK" is a 6 level system that measure the learner's language capability for simplified Chinese, while "TOCFL" is a 6 level system that measure the learner's language capability for traditional Chinese.

Affinity knowledge library 140 preferably comprises word-pairs for at least 2, 3, 4, or all of the above targeted affinity interests, and weights the word-pairs as a function of the number of co-occurrences in the sources, and as a factor of other weighting by the system, such as trustworthiness and currentness.

Figure 2:
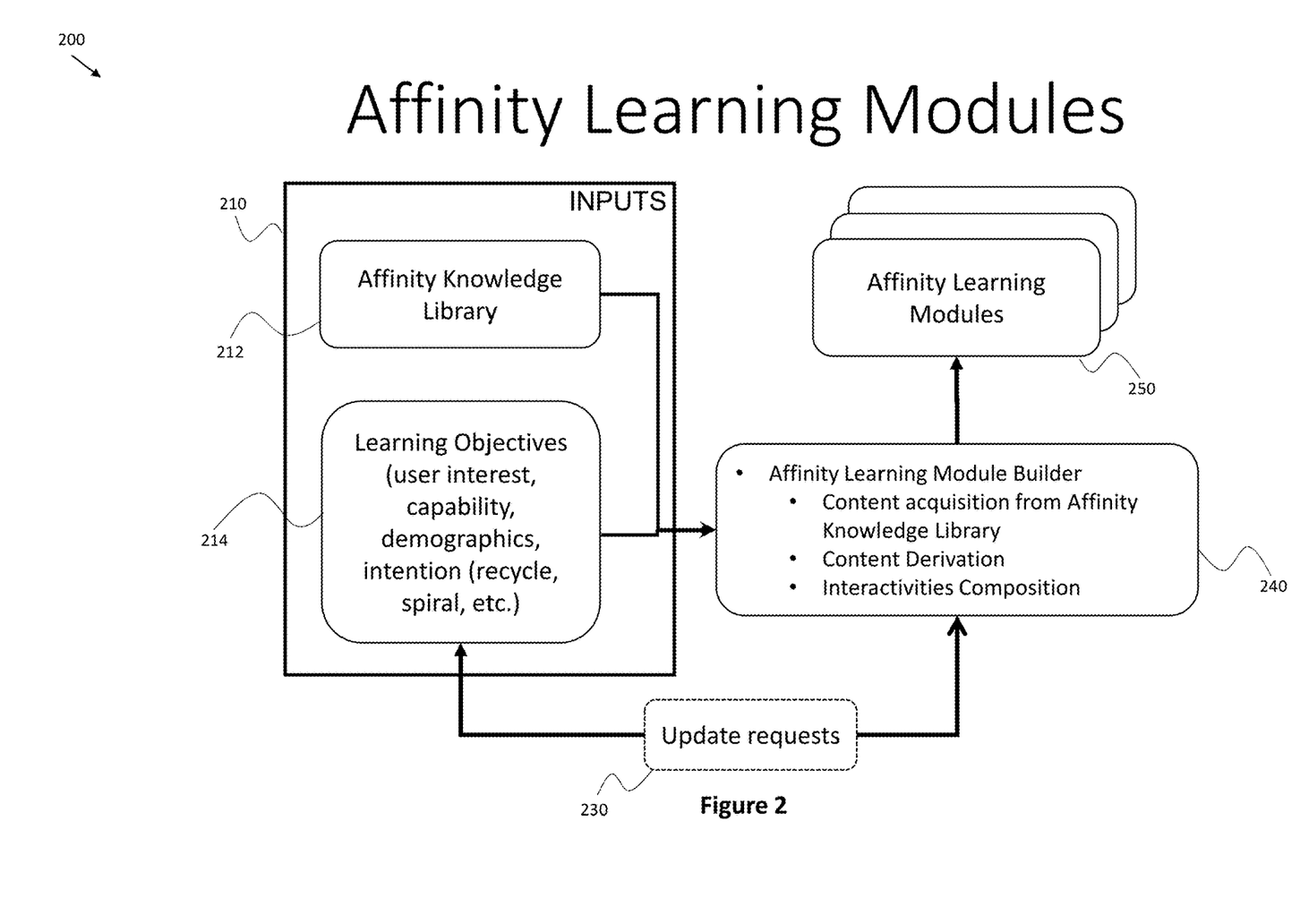
FIG. 2 is a schematic describing modules used to build an affinity learning module.

FIG. 2 shows a schematic 200 showing how a contemplated affinity learning module exercise could be constructed, having inputs 210 that are fed into an affinity learning module builder 240 to generate one or more affinity learning modules 250. As used herein, an "affinity learning module" comprises a unit of learning content created using one or more elements from affinity knowledge library 212 and learning objectives 214 to support a coherent and targeted learning objective, preferably in real time or cached if need be, as forward-looking modules for a user or a group of users.

Affinity learning module builder 240 both creates and maintains affinity learning modules 250, as learning modules frequently need to be updated over time. Specifically, the tasks for affinity learning module builder 240 comprise:

(1) Acquiring content elements from affinity knowledge library 212 as a function of the desired learning objectives 214 suitable for an individual and/or a user group.

(2) To further aggregate and/or transform the content of the affinity learning modules for user-friendly presentation.

(3) To compose gamification and engagement plans that provide interactions suitable for the content.

(4) To respond to update requests 230 by reworking affinity learning module 250 as needed in order to keep the content of the learning module in sync with both desired learning objectives 214 and updated affinity knowledge libraries 212.

Learning objectives 214 are typically generated by an administrator user, such as a teacher or other curriculum-builder, and comprises at least (1) a user interest (e.g. engineer, doctor, lawyer, finance), (2) a capability (e.g. 1v. 1, 1v. 2), (3) a demographic (e.g. age, race, primary language, learning disability), (4) intention (e.g. recycle, spiral), which will be used by affinity learning module builder 240 to generate affinity learning modules 250.

As an example, learning objective 214 could comprise information defining a high school student learning Chinese language with an interest in immunology. In addition, the student's current Chinese learning capacity is similar to the HSK system of level 4 and the student fits a spiral learning strategy.

Based upon this learning objective 214, affinity learning module builder 240 could then select and compile Chinese text from affinity knowledge library 212 that contains word vectors that are related to the interest in immunology, such as white cell, t-cell, etc. Affinity learning module builder 240 could then further filter the word vectors to limit the module builder to contain vocabulary and grammar styles that meet the level of difficulty for a level 4 of HSK system for simplified Chinese words. Affinity learning module builder 240 preferably selects text that meets affinity criteria above a given threshold, such as 80% or 90%. Once the content (in this case words) is selected from the affinity knowledge library, the content is abstracted, and affinity learning module builder 240 could generate a word puzzle game as well as a fill-the-blank or word rearrangement game using the words and key grammar points that are appropriate for a level 4 of the HSK system.

Once an affinity learning module is generated, the system could send an update request 230 to affinity learning module builder 240 and possibly learning objectives 214 (if the learning objectives need to be updated) to update one of the affinity learning modules 250. For example, after an update request 230 is received, affinity learning module builder 240 could compare the words selected for a user (or group of users) against previous learning trails of the student (not shown) and could remove or lower the weight of words and grammar styles that the student has done well on, to concentrate content on the remaining words and grammar styles that the student has not done well on or to emphasize new material.

The system could also build affinity learning modules using the affinity knowledge library by associating words and word-pairs with profiles of student affinities, which could be used as an input instead of learning objectives 214. As used herein, "student affinities" are characteristics of a student, or a class of students, such as a difficulty level, a language, a subject, and a learning strategy. Student affinities for a student could be defined manually through a user interface, such as a user interface that queries a student, parent, or teacher for the student's characteristics and goals, student affinities for a student could be defined automatically by analyzing the student's results on various exercises, or a combination of techniques could be used to define student affinities (e.g. the student and parent initially take a survey, and as the student uses the system, the system adjusts the student affinities accordingly). As a student (or a class of students) complete exercises, a historical archive of exercise results could be archived on a database of the system, which can be used to assign values to student affinities for the student (or class of students). The system could update student affinities dynamically, updating student affinities as a student completes each exercise of the system. The system could also analyze an entire class of student affinities, and provide a user interface to an admin user, allowing the admin user to manually group student affinities into a group (e.g. by averaging the values of a student affinity matrix) and to create a personalized student affinity matrix that could be applied to a subset of a class, for example the top performing 10% of the class or the bottom performing 10% of a class. In a preferred embodiment, an admin user could create a template that automatically generates such personalized matrices.

Affinity learning module builder 240 typically gleans student affinities from a learning objective module to create content for the student profile. The system could select words in the affinity knowledge library as a function of the student affinities and independent affinities. For example, the system could determine that a student with a word difficulty level of 1 has an interest in biology, and could then select words having a difficulty of level 1 and a theme of biology. The system could also select additional words by examining word-pairs having high affinity levels for the selected words. The system could use global word-pair affinities, or context-sensitive word-pair affinities (e.g. word-pair affinities just for biology themes or just for mathematics themes) to select the additional words, and then could build an exercise for the profile using the selected words. Once the exercise is selected, the exercise could be added to the profile for use by users of the profile. For example, the selected words could be fed into a game building engine that builds a game using the selected words.

The system could also assign one or more exercise affinities to an exercise created by the affinity learning module builder. The exercise affinity is typically derived by comparing attributes of the exercise with the student affinities of the profile. Using the exercise affinities, the system could then rank-order the different exercises that are associated with the profile, and could select exercises to present to a user of the profile in accordance with the derived exercise affinities (e.g. present the 5 exercises with the highest exercise affinities).

Figure 3:
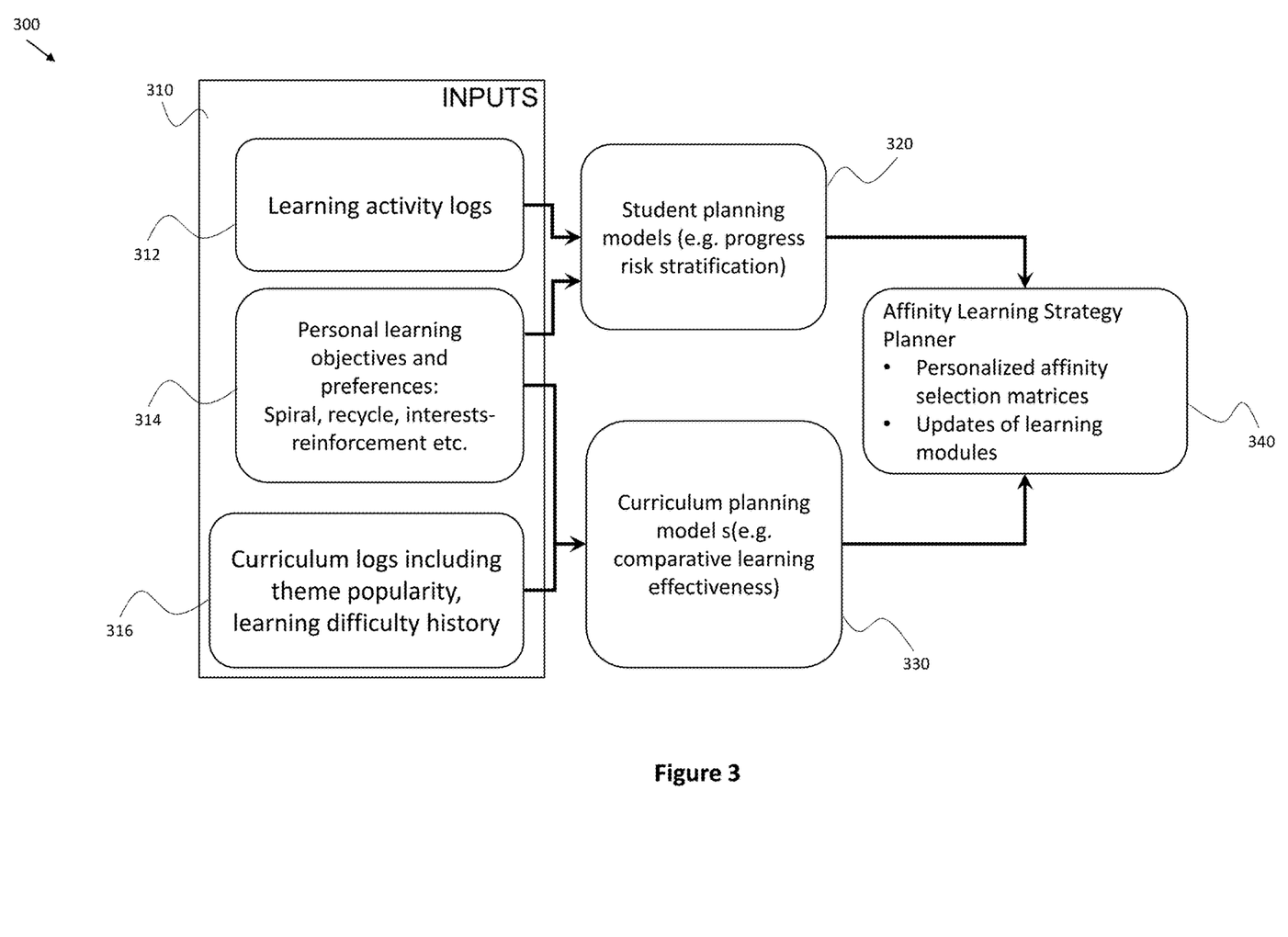
FIG. 3 is a schematic describing modules used to build an affinity learning strategy planner.

In FIG. 3, a schematic 300 shows how an affinity learning strategy planner 340 might be generated by the system using inputs 310 comprising learning activity logs 312, personal learning objectives 314, and curriculum logs 316. The affinity learning strategy planner 340 is preferably generated using machine learning techniques that analyze student learning behaviors, derive the comparative effectiveness of learning strategies, and guide the content creation process.

A learning strategy planner 340 comprises a student learning planning model sub-module and a strategic curriculum planning model sub-module that uses data such as student's demographics, individual interests, learning objectives, teaching themes, past learning trails of a user or a user group, past decision trails of a user and/or a user group and comparative effectiveness of curriculum over time, as well as other factors.

It creates a set of personalized affinity selection matrices to guide the affinity content creation. It generates update requests to the affinity learning module builder for background learning content curation.

Figure 4:
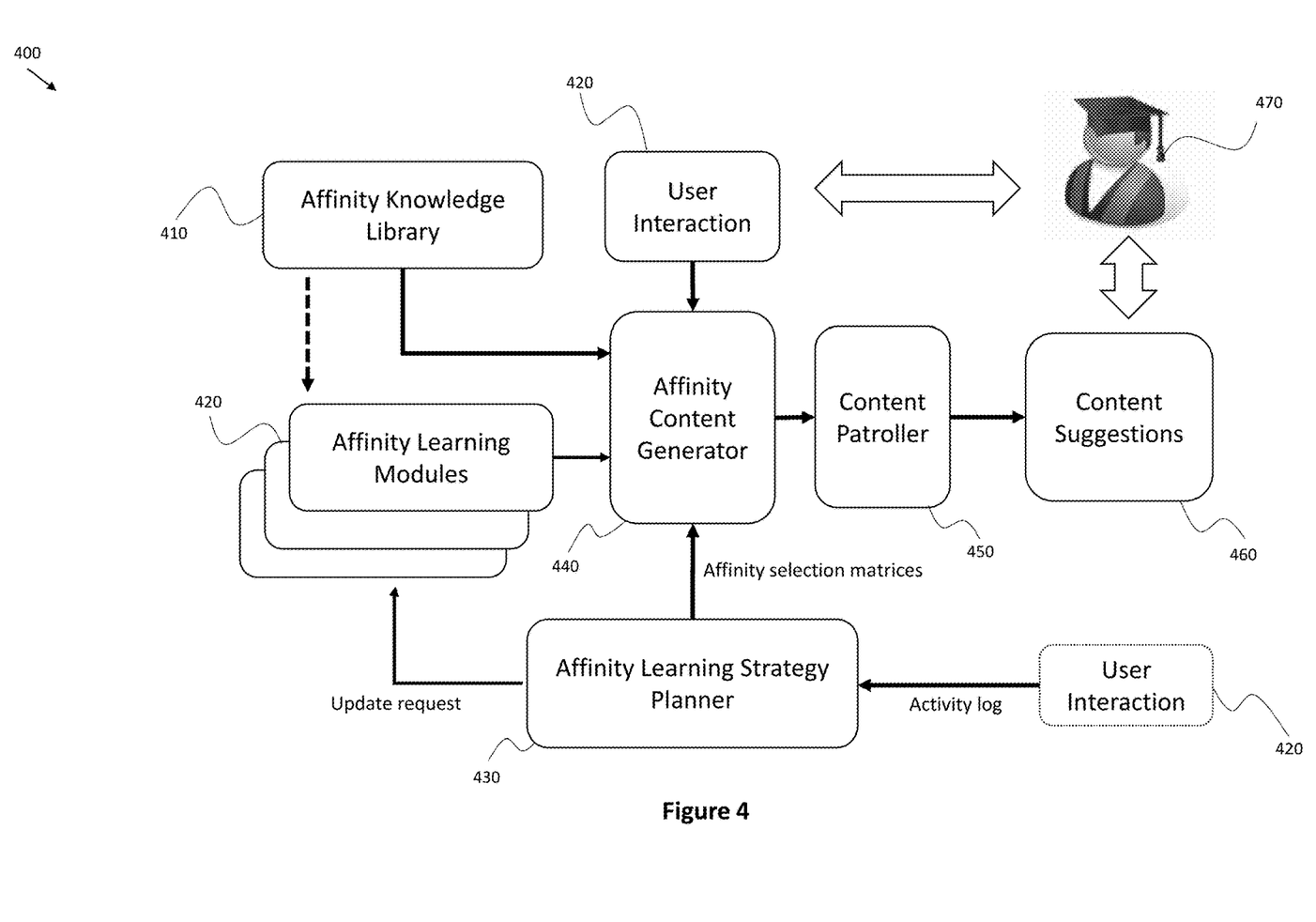
FIG. 4 is a schematic describing how content suggestions and user interaction feedback with an inventive system to create affinity content.

In FIG. 4, a schematic 400 illustrating how an affinity content generator 440 could suggest content 460 for a student 470 or a class. Affinity content generator 440 uses the affinity knowledge library 410, together with or without other affinity modules 420, and a set of personalized affinity selection matrices from affinity learning planner 430 to serve up a pareto-optimal set of affinity content. As a user interacts with a system, the activity log of the user's interaction 420 is received by the affinity learning strategy planner 430, which feeds affinity selection matrices to affinity content generator 440 while transmitting periodic update requests to affinity learning modules 420, and preferably updates the learning objectives.

An exemplary procedure for an affinity content generator to generate content is as follows:
(1) Compute the probability score of learning affinity for student m when that student is being presented a learning element $L_j$, the probability is indicated by $S_m(Lj)$, where $$S_m(Lj) = [1 + \exp(\beta_j^T X_m)]^{-1}$$

among which $\beta$ is the targeted affinity interest model coefficients of learning element j collected from affinity knowledge library 410 (for a generic student) or affinity learning module 420 (for a specific student or class with specific learning objectives), and $X_m$ is the student affinity selection matrices received from learning strategy planner 430.

(2) Retrieve from affinity knowledge library 410 and affinity learning modules 420 a set of candidate learning elements and rank them in the pareto-optimal order according to the calculated $S_m$ values, and test to see if the total bundle satisfies a minimal learning utility function threshold U of student m. Only keep candidate learning elements having a calculated $S_m$ value that exceeds the $U_m$ threshold.

$$(\Sigma_{j=1}^{j=n} S_m(Lj)) >= U_m$$

$U_m$ can be adjusted by an admin user or automatically as a function of a desired intensity of a student following an affinity learning path (usually saved in a template saved in a database that is retrieved by the system).

Content generated by affinity content generator 440 could be fed to content patroller 450, which filters content, and then presents the content suggestions 460 to student 470. As student 470 uses the system, user interaction 420 is recorded by activity logs that are fed into affinity learning strategy planner 430.

Figure 5:
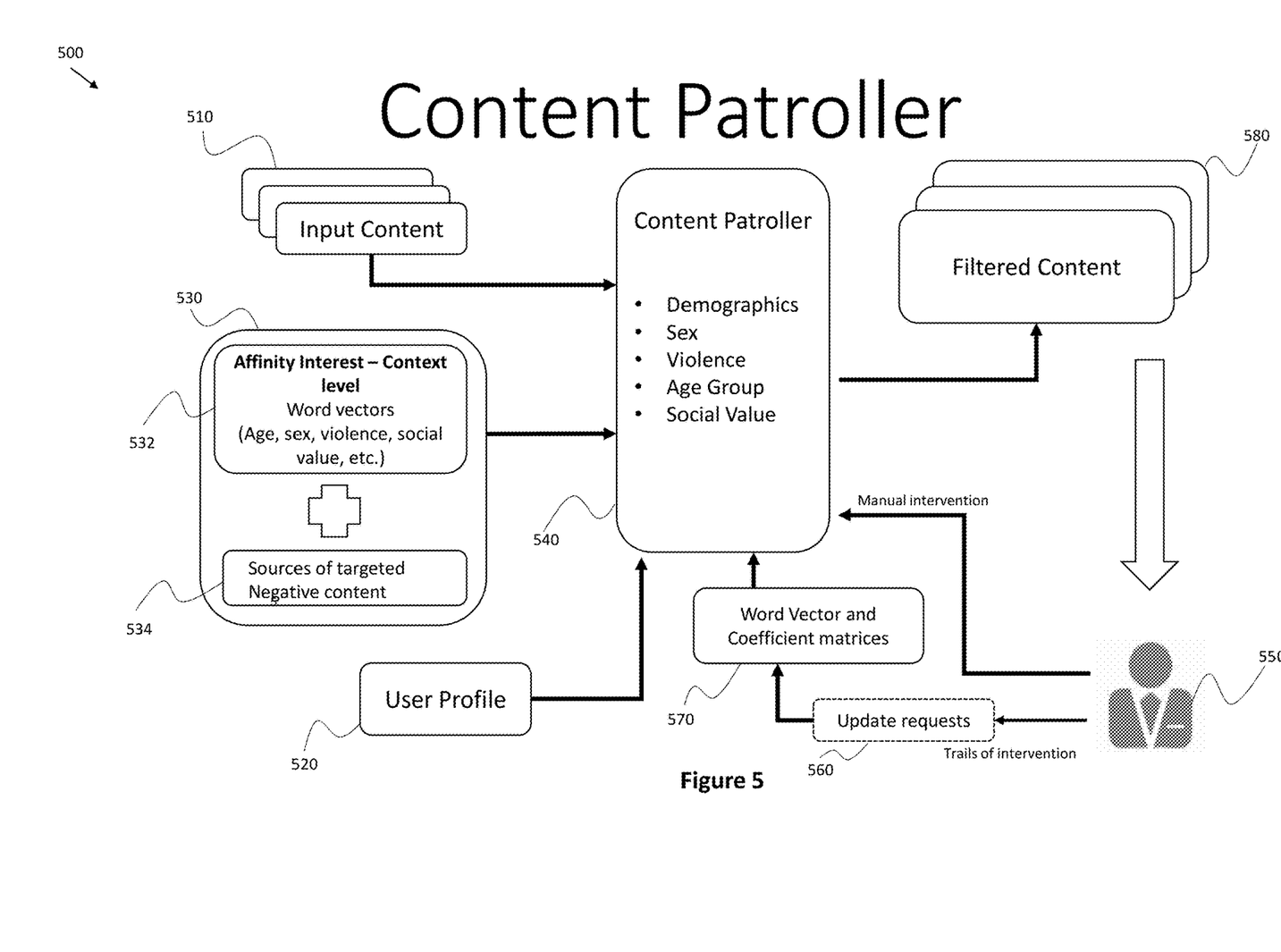
FIG. 5 is a schematic describing modules used to filter content provided to a user.

In FIG. 5, a schematic 500 shows how a content patroller 540 could filter out content 510 (for example, content 460), based upon a negative content affinity knowledge library 530, a user profile 520 of a student or a class of students, a manually populated word vector and/or coefficient matrix 570, or via manual intervention from an admin user 550. Content could be filtered based upon student profile characteristics, for example demographics, sex, violent content, age group, and/or social value of the words. The content patroller could filter the content generation results by criteria such as age appropriateness, sex, violence, social value, etc. before the contents are presented to the user.

Content patroller 540 preferably operates automatically at all times to negate inappropriate content based on one or more filters. Negative content affinity knowledge library 530 is generated by generating context-level word vectors where each context level 532 is a chosen filter, such as age (e.g. below the age of 18, below the age of 12), sex (nudity, copulation, pornography), violence (martial arts, gun violence, street violence, riots), societal value (public discourse, gossip, fake news), etc. The context level 532 could then be applied to multiple sources, for example sources known to have negative content 534, to generate a negative context affinity knowledge library 530 that is then transmitted to content patroller 540 to identify portions of input content 510 that may have negative content. In some embodiments, an administrator user chooses the sources 534 and the context level 532, while in other embodiments the system automatically applies appropriate context levels and sources as a function of the user profile 520. For example, a user profile may identify the age of a student, which could be used by the system to identify what age the context level should be set at.

Sets of word vectors and related coefficient matrices 570 could be initially assigned to profiles of various user groups by the system, but can be further adjusted by authorized users 550 at either the system level or the user level (an individual user first inherits the profile from a user group and then can get manual intervention as needed). Coefficient matrices are generated by the system as a function of historical user logs, such as how often a user selects a word or how often a user gets a word incorrect. Such words (or word pairs) could have a higher weight than words (or word pairs) that the user does not get incorrect. The word vectors and matrix coefficient matrices 570 could be automatically updated in a periodic fashion (e.g. once every day or once every week), or could be updated as a function of a manual update request 560 transmitted by an admin user 550. In some embodiments, an admin user 550 could manually censor the content via content patroller 540, or could tweak any of the inputs of the negative content affinity knowledge library 530, user profile 520, or word vector and coefficient matrices 570. Content patroller 540 could be programmed to examine any newly generated content for the probability score of negative context based on the presence of word vector and associated coefficient matrices, using the same procedure of content generation. The resulting probability that exceed the configured intensity threshold will be filtered.

Figure 6:
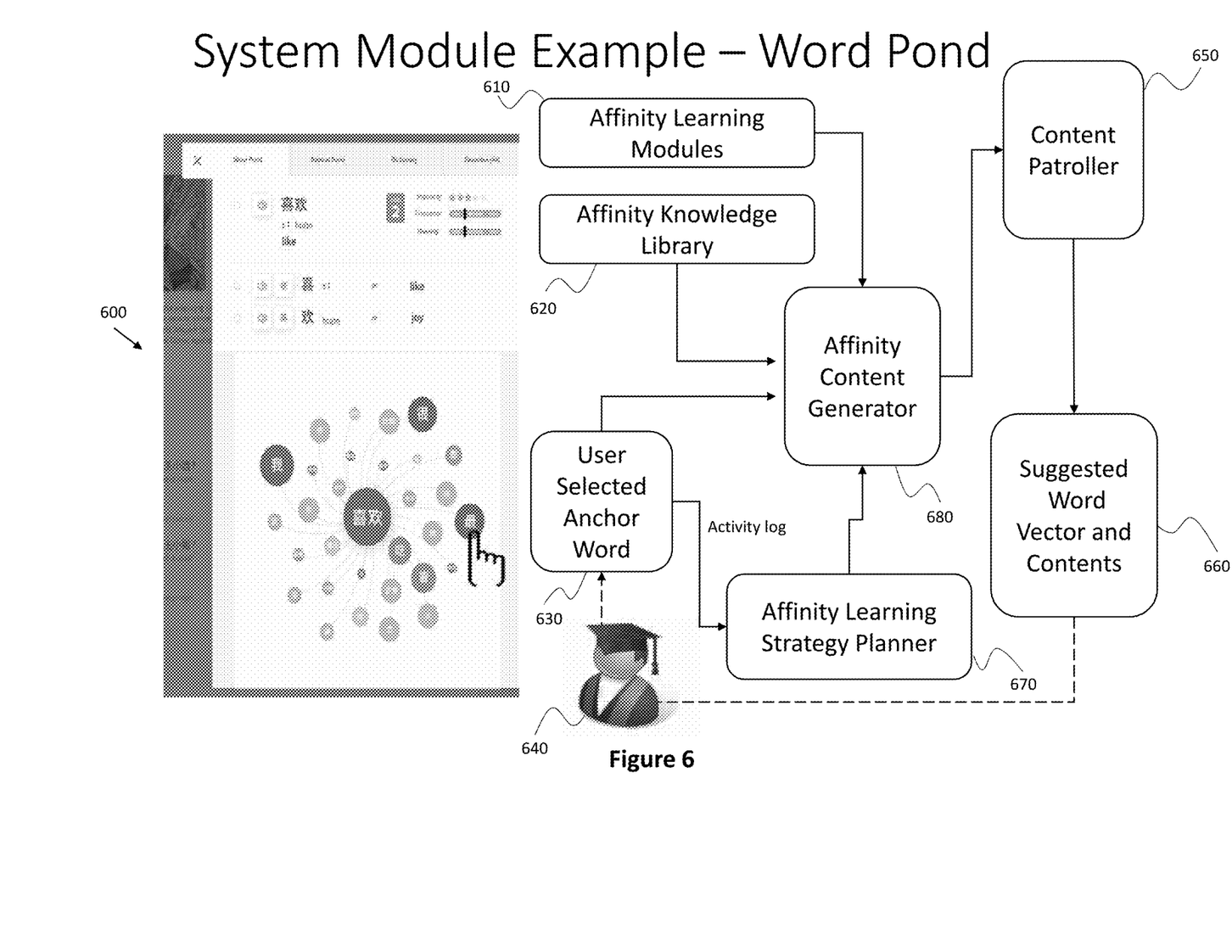
FIG. 6 is a schematic describing modules used to create a Word Pond.

FIG. 6 shows a word pond 600 generated for student 640. Word pond 600 is a graphical way of displaying a suggested word vector and its contents 660 to a user interface for student 640. Word pond 600 is a gamified and visually appealing tool with which a user can interact and engage with the system to learn a language, such as Chinese vocabulary. Affinity learning modules 610 and affinity knowledge library 620 are fed into affinity content generator 680, which generates word vectors and contents 660 that are filtered by content patroller 650, and are shown o student 640 as word pond 600. Word pond 600 shows a center word that is associated with many other words as a word pair. Word pairs that have a higher weight are given a larger size and a darker color oval than word pairs that have a lower weight. Here, the word pond shows the top 30 word pairs with the center word, although the system could have a threshold value of more or less word pairs to show.

When a user chooses an anchor word Word Pond map (shown here as the anchor word having the finger icon touching it), affinity content generator 680 will preferably retrieve data from affinity knowledge library 620 and affinity learning modules 610. In some embodiments, the content could be influenced by an affinity learning strategy planner (not shown) that will feed affinity selection matrices to the affinity content generator to optimize the learning effectiveness of the student based on the learning objectives. Content will then preferably be filtered by content patroller 650 before the content 660 is presented to user 640 as another word pond. A segment will appear on the new word pond page, centering the selected anchor word with updated word vectors for the map.

On the Radical Pond page (not shown), the content supplied has affinity interest for components in the word level.

On the Dictionary, the page will provide the definition of the word. In addition, the page presents sentences from both Affinity Knowledge Library and/or sentences in Affinity Learning Modules with a suggestive invitation link to engage further.

The trails of the user's engagement and/or activities could be used to update student affinities.

Affinity learning module Pondlets could also be generated by the system in this manner. As used herein, a "Pondlet" is an instance or a type of Affinity Learning Module. These affinity learning modules are created for a various target user or user groups based on sets of pre-defined learning objectives. The collection of modules (a set of pondlets) can be viewed a set of system generated curriculum. When the user or the user group engage with the system, the trails of the user data will be used to update the factors of the learning objectives which influence the making of future Affinity Learning Module. At the same time, the factors also update the Learning Strategy Planning Module that influence the Affinity Content Generator in providing and suggesting new set of Pondlets that optimizes the effectiveness and efficiency of the user or user group. In an environment like a classroom, the collections of the Pondlets can be used as a curriculum. Depending on the learning objective and capacities of the users, the set of the Pondlets can be different among learners or group of learners. Allowing the teacher to customize curriculums for each students or a group of students. For an expert user like a teacher, there is an ability to override the composition and/or the order of the system generated modules and store the new combination for later use (My curriculums). The trails of data from engagement of users and expert users will both change the underlying factors for the learning objectives and Learning Strategy Planning Module.

Figure 7:
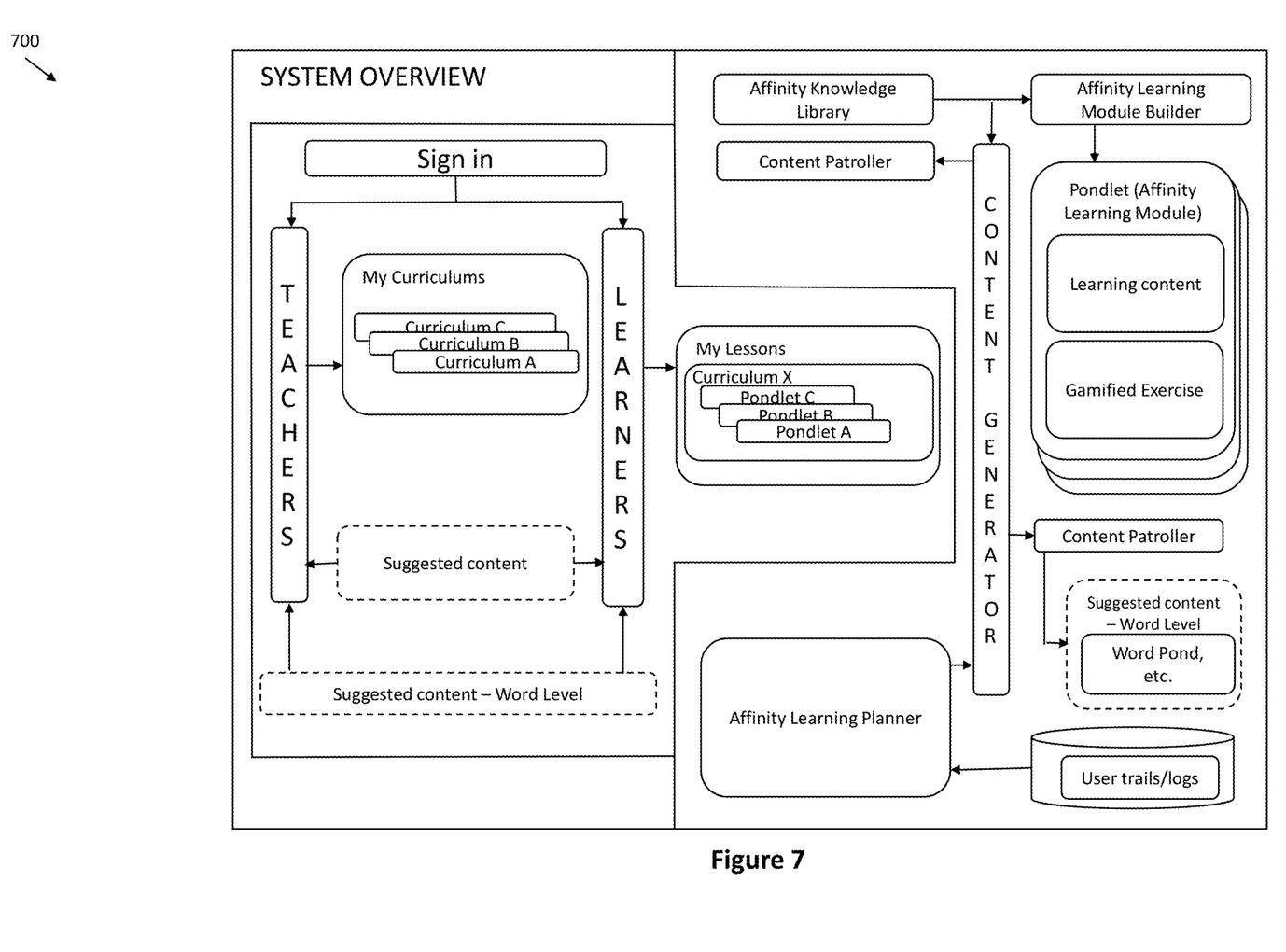
FIG. 7 is a schematic of a system overview of an embodiment of the invention.

An overview of a system utilizing the tools described herein is shown in FIG. 7. Machine suggested content is shown in the dotted lines, where exercises, ponds, and pondlets are presented to users of the system.

Figure 8:
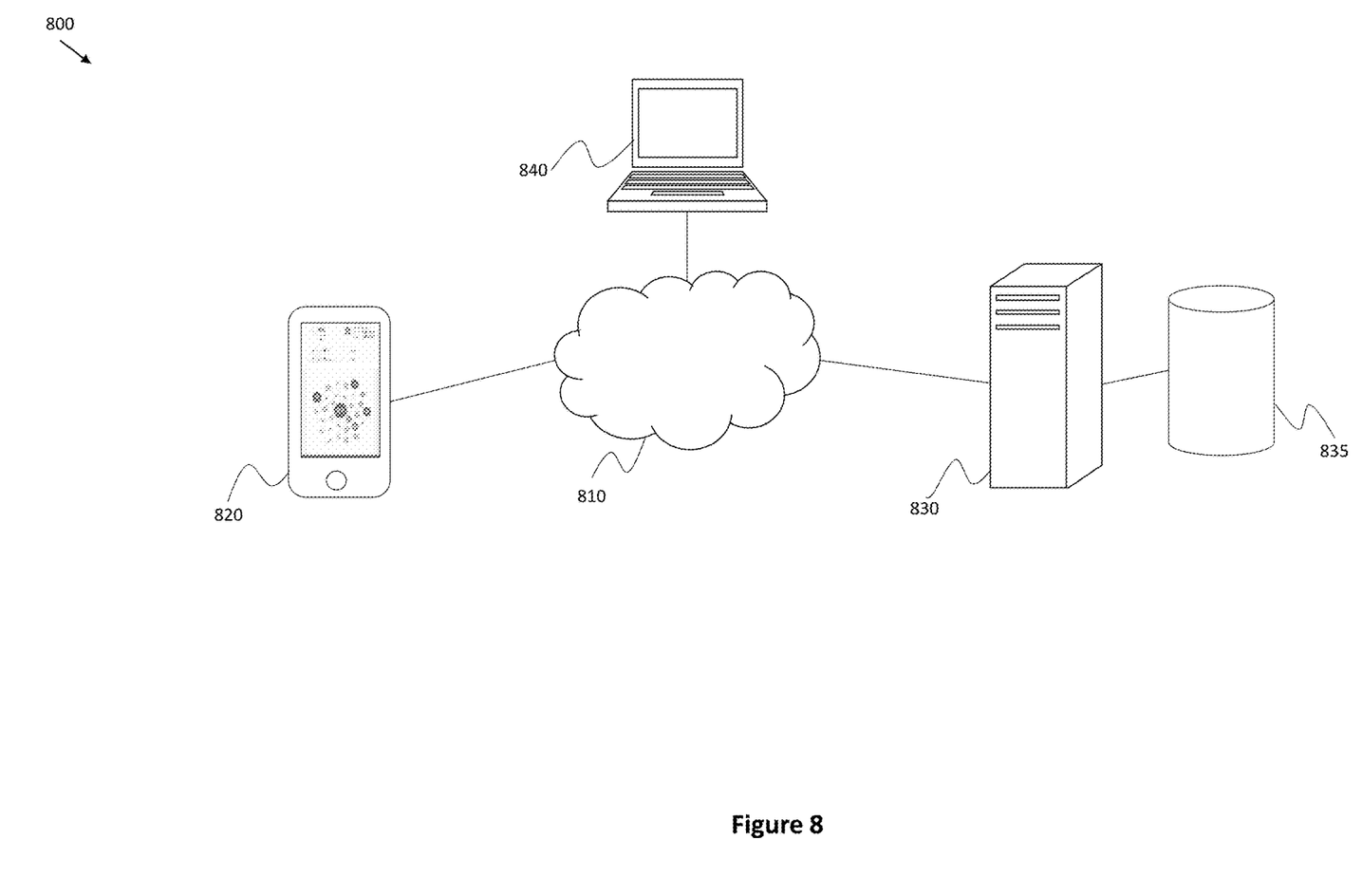
FIG. 8 is a hardware schematic of an exemplary affinity knowledge system.

FIG. 8 shows an exemplary hardware schematic 800 of a network 810 that functionally couples a student user interface 820 with an affinity system 830 and an administrator user interface 840. Affinity system 830 is shown euphemistically as a single computer system, however affinity system 830 could be a distributed computer system or could be a virtual machine implemented in a compute server environment. Affinity system 830 is coupled to storage device 835, which is shown as a database, but could be a NAS or a distributed storage system, or could even be functionally coupled to affinity system 830 via network 810.

Network 810 could be any hub that is used to communicate data from one computer system to another computer system, such as a packet-switched network, the Internet, LAN, WAN, VPN, or other suitable data hub. The network infrastructure is such that an application on affinity system 830 is able to freely communicate with student interface 820 and admin interface 840.

Student interface 820 is shown euphemistically as a mobile phone, but could be any suitable computer system having a user interface through which a student can communicate with affinity system 830 and interact with content provided by an affinity content generator, such as ponds and pondlets.

Administrative user interface 840 is shown euphemistically as a computer terminal communicatively coupled with network 810, but could be any suitable computer system with an interface that allows an administrative user (not shown) to communicate with affinity system 830 and tweak data. In some embodiments, administrative user interface 840 interacts with affinity system 830 via a web portal that is customized to allow an administrative user (such as a teacher or a curriculum designer) to alter templates, such as learning objectives of a student or class, dynamic and fixed sources for an affinity knowledge library, targeted affinity interests for an affinity knowledge library, learning objectives for a student or class, etc.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method for building an affinity-targeted curriculum, comprising executing on a processor the steps of:

defining dependent affinities for word-pairs in a language database having a plurality of words;

defining dependent affinity functions for at least some of the dependent affinities based upon word-pair relationships of the word-pairs, wherein the word-pair relationships must comprise at least three of a shared theme, a shared context, a shared root, a shared radical, a shared phonetic sound, a shared phonemic sound, and a shared prosody;

receiving a user interaction of a selection of a first anchor word from a user interface of a mobile device;

deriving first anchor word-pairs having at least one of the word-pair relationships using the dependent affinity functions and the first anchor word;

saving the first anchor word-pairs with associated dependent affinities to an affinity knowledge library;

transmitting an update request to update a learning objective for a user in response to receiving an activity log of the user interaction to select the first anchor word;

generating a $\beta_1$ coefficient matrix for the user as a function of how often the user has selected a word, wherein the $\beta_1$ coefficient matrix provides a lower weight to a word selected more often by the user;

generating an $X_1$ student affinity selection matrix for the first anchor word-pairs, wherein the $X_1$ student affinity selection matrix provides a higher weight to word-pairs having a word-pair relationship in a more current source than to word-pairs having a word-pair relationship in a less current source;

displaying the first anchor word-pairs as a first word pond via the user interface of the mobile device as a function of the saved first anchor word-pairs in the affinity knowledge library, wherein the processor automatically designates a size of each of the first anchor word-pairs as a function of a weight defined by $[1+\exp(\beta_1^T X_1)]^{-1}$;

receiving a selection of a second anchor word from the user interface of the mobile device;

deriving second anchor word-pairs having at least one of the word-pair relationships using the dependent affinity functions and the second anchor word;

saving the second anchor word-pairs with associated dependent affinities to the affinity knowledge library;

generating a $\beta_2$ coefficient matrix for the user as a function of how often the user has selected a word, wherein the $\beta_2$ coefficient matrix provides a lower weight to a word selected more often by the user;

generating an $X_2$ student affinity selection matrix for the second anchor word-pairs, wherein the $X_2$ student affinity selection matrix provides a higher weight to word-pairs having a word-pair relationship in a more current source than to word-pairs having a word-pair relationship in a less current source;

displaying the second anchor word-pairs as a second word pond to the user interface of the mobile device as a function of the saved second anchor word-pairs in the affinity knowledge library, wherein the processor automatically designates a size of each of the second anchor word-pairs as a function of a weight defined by $[1+\exp(\beta_1^T X_1)]^{-1}$.

2. The computer-implemented method of claim 1, wherein at least one of the dependent affinities comprises at least one of a single value, a plurality of values, and a range of values.

3. The computer-implemented method of claim 1, further comprising increasing a favorability weight of a word-pair as a function of the number of co-occurrences in the language database and a publication date of a source containing the co-occurrence.

4. The computer-implemented method of claim 1, wherein the word-pair relationships also comprise at least one of a probability of sentence co-location, a probability of paragraph co-location, and a co-location within a selected number of words.

5. The computer-implemented method of claim 1, further comprising executing on the processor the step of defining dependent affinity functions for the derived first anchor word-pairs as a function of corresponding dependent affinities.

6. The computer-implemented method of claim 5, wherein the step of deriving word-pair affinities further comprises assigning a weight to at least some of the dependent affinities.

7. The computer-implemented method of claim 5, further comprising executing on the processor the steps of:
associating a word in the affinity knowledge library to associated word-pairs; and
ranking the associated word-pairs as a function of the word-pair affinities.

8. The computer-implemented method of claim 1, further comprising executing on the processor the steps of:
defining independent affinities for words in the language database;
defining independent affinity functions for at least some of the independent affinities based upon word attributes of the words in the language database;
identifying words having at least one positive independent affinity using the independent affinity functions;
saving the identified words with independent affinities to the affinity knowledge library;
providing the identified words with independent affinities to the user interface; and
receiving a selection of the first anchor word from the provided identified words with positive independent affinities.

9. The computer-implemented method of claim 8, further comprising executing on the processor the step of assigning a value to at least one of the independent affinities via the user interface.

10. The computer-implemented method of claim 8, further comprising executing on the processor the steps of:
receiving a profile comprising student affinities;
selecting words in the affinity knowledge library as a function of the student affinities and identified words with positive independent affinities;
building an exercise for the profile as a function of both the selected words and first anchor word-pairs having at least one of the word-pair relationships, and
providing the exercise to a user interface corresponding with the profile.

11. The computer-implemented method of claim 10, further comprising executing on the processor the steps of:
deriving word-pair affinities for the first anchor word-pairs as a function of corresponding dependent affinities;
selecting word-pairs associated with the selected words as a function of the word-pair affinities; and
incorporating additional words in the exercise for the profile as a function of the selected word-pairs.

12. The computer-implemented method of claim 10, wherein the profile comprises a profile for a single student.

13. The computer-implemented method of claim 10, wherein the profile comprises a profile for a class of students.

14. The computer-implemented method of claim 10, further comprising executing on the processor the step of assigning a value to at least one of the student affinities as a function of a historical archive of exercise results associated with a user.

15. The computer-implemented method of claim 10, further comprising executing on the processor the step of assigning a value to at least one of the student affinities as a function of a historical archive of exercise results associated with a class of students.

16. The computer-implemented method of claim 10, further comprising executing on the processor the step of updating a value of at least one of the student affinities as a function of exercise results for the exercise when the user completes the exercise.

17. The computer-implemented method of claim 10, further comprising executing on the processor the step of updating a value of at least one of the student affinities as a function of exercise results for the exercise when a student of a class of students completes the exercise.

18. The computer-implemented method of claim 10, wherein the step of selecting words in the affinity knowledge library comprises selecting words having an independent affinity that matches at least one of the student affinities.

19. The computer-implemented method of claim 10, wherein the step of building the exercise for the profile as a function of the selected words comprises seeding a game building engine with the selected words.

20. The computer-implemented method of claim 10, further comprising executing on the processor the steps of:
deriving an exercise affinity for the exercise as a function of the student affinities; and
saving the exercise with the derived exercise affinity in a database of exercises associated with the profile.

21. The computer-implemented method of claim 20, further comprising executing on the processor the steps of:
rank-ordering the database of exercises as a function of the exercise affinity of each exercise;
selecting a subset of the database of exercises as a function of the rank-order; and
providing the subset of the database of exercises to the user interface associated with the profile.

22. The computer-implemented method of claim 10, wherein the profile further comprises student characteristics, and wherein the step of selecting words in the affinity knowledge library further comprises filtering out words as a function of the student characteristics.

23. The computer-implemented method of claim 10, wherein the student affinities comprise at least one of the group consisting of a demographic, an interest, a learning objective, a teaching theme, a historical learning trail, and a historical decision trail.

24. The computer-implemented method of claim 10, further comprising executing on the processor the steps of:
- receiving a profile comprising student affinities;
- selecting words in the affinity knowledge library as a function of the student affinities and independent affinities;
- building an exercise for the profile as a function of the selected words and a historical effectiveness of a first curriculum compared to a second curriculum, and
- providing the exercise to the user interface corresponding with the profile.

25. The computer-implemented method of claim 10, further comprising executing on the processor the steps of:
- generating personalized affinity selection matrices as a function of the student affinities; and
- building a curriculum comprising the exercise for the profile as a function of the personalized affinity selection matrices.

26. The computer-implemented method of claim 1, further comprising executing on the processor the step of providing, via the word-pond, a dictionary page that provides a definition of the selected word.

27. The computer-implemented method of claim 1, wherein the word-pair relationships for each word-pair must comprise a shared root, a shared radical, and a shared prosody.

* * * * *